J. J. Greenough,
Pegging Machine,
No. 700, Reissued Apr. 26, 1859.
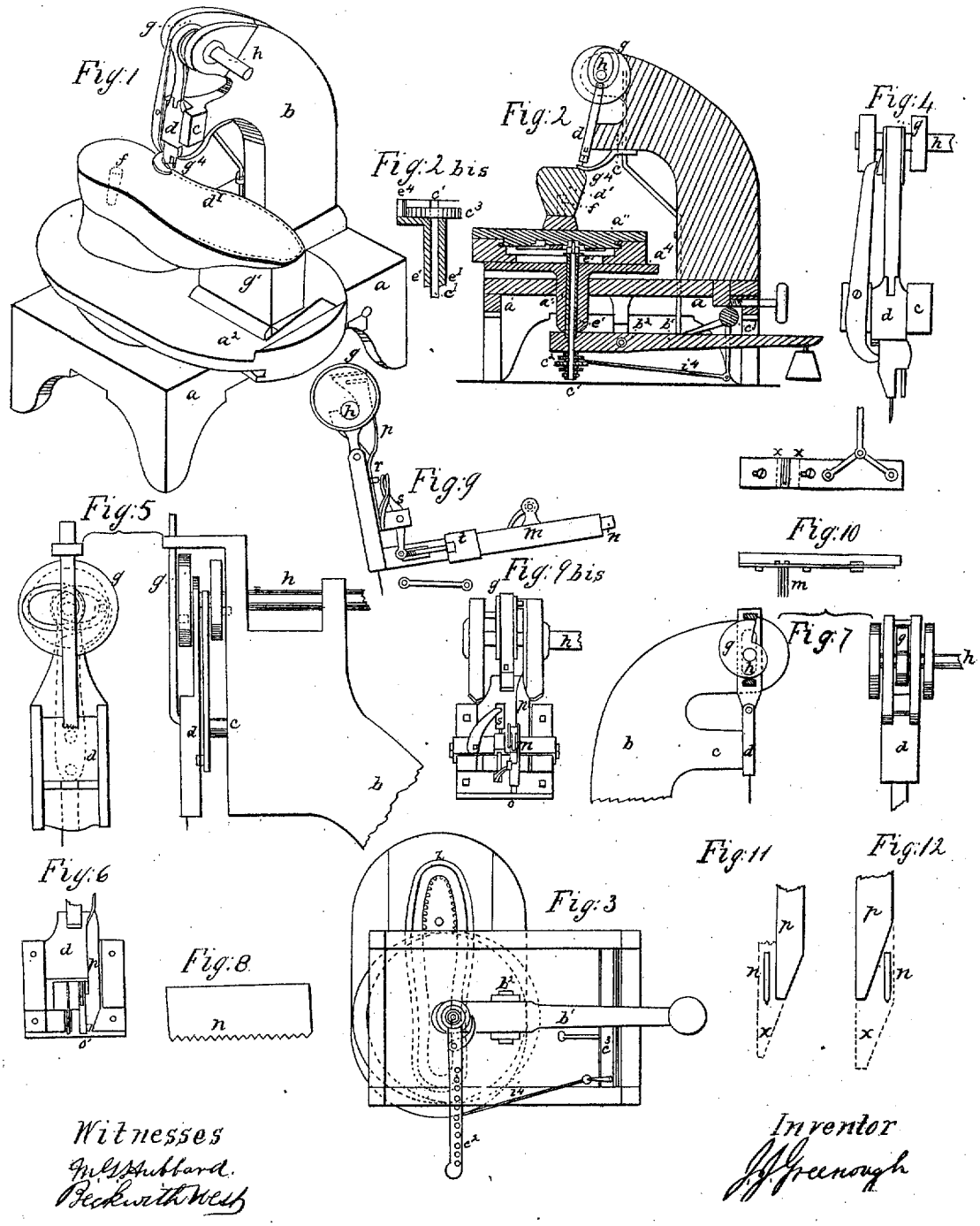
Witnesses
M. L. Hubbard.
Beckwith West
Inventor
J. J. Greenough

UNITED STATES PATENT OFFICE.

JOHN JAMES GREENOUGH, OF NEW YORK, N. Y.

IMPROVEMENT IN MACHINES FOR PEGGING BOOTS AND SHOES.

Specification forming part of Letters Patent No. 10,427, dated January 17, 1854; Reissue No. 269, dated July 4, 1854; Reissue No. 700, dated April 26, 1859.

*To all whom it may concern:*

Be it known that I, JOHN JAMES GREENOUGH, of the city, county, and State of New York, have obtained Letters Patent of the United States, dated the 17th day of January, 1854, for several inventions in Shoe-Pegging Machinery, which I now desire to separate and to have reissued to me in several distinct patents; and I do hereby declare and ascertain one of said inventions contained in said Letters Patent, referring to the accompanying drawings, in which—

Figure 1 is a perspective view of the machine; Fig. 2, a vertical section; Fig. 3, a plan from below; Fig. 4, an awl and peg-stock detached; Fig. 5, a modification; Fig. 6, a front view of pegging-stock, &c.; Fig. 7, a modified section; Fig. 8, peg-wood; Fig. 9, peg-feed; Figs. 10, 11, 12, peg-cutters.

In some of the machinery intended for pegging shoes and boots prior to my said invention attempts were made to cut off the pegs one by one from a strip of peg-wood, but, so far as I am informed, such attempts failed of practical results, because the cutter was made to move or perform its cutting action in the assumed direction of the grain of the wood—that is, in the direction of the breadth of the strip; and as the grain of the wood is not always straight—that is to say, at right angles to the edges of the strip—it unavoidably followed that when the grain of the wood was not in the true line the pegs were sometimes too thin and sometimes too thick, in the former case producing defective work and in the latter frequently stopping or breaking the machine.

The above objection I have avoided by my invention, which consists in combining with machinery for driving pegs into shoes or boots, and with ways in which the strip of peg-wood slides, a reciprocating cutter, which acts at right angles with the face of the strip of peg-wood and with a cutting edge equal to the width of the strip, that it may act upon the whole length of the intended peg by cutting across the grain instead of with the grain.

In pegging shoes by machinery where strips of wood are used the difficulty heretofore experienced in splitting off the pegs by the cutter that severs them from the strip of peg-wood, (shown in Fig. 8,) by passing it upward and downward through the aforesaid strip of wood, has been this: If the grain of the wood incline either way from a right angle to the top and bottom lines of the pegs, as indicated by the dotted lines, which show the grains of the wood in Fig. 8, the pegs will be split off from the strip of wood of unequal sizes, and will impede, if not wholly prevent, the working of the machine, as before stated.

My device consists in cutting off the pegs laterally, or by a cut on the side of the strip of peg-wood the whole length from top to bottom, cutting across the strip and making straight parallel cuts, so as to form all the pegs of the same size and straight from top to bottom, however the grain of the wood may be. To effect this, I use any known cutter convenient, (a cutter forming no part of my invention, but being simply a mechanical element used therein.)

In Fig. 9 the peg-wood *n* is fed into a recess, *o*, formed in a metal block, as seen at *o'*, Fig. 6. This recess is just the size and depth of the peg, and the end of the peg-strip, such as is seen at Fig. 11, is thrust into it by any continuous feed apparatus—such as a spring, a weight, rollers, clamps, or screw.

The parts used for feeding the pegs into the driving apparatus and forcing them from the strips of peg-wood consist of a trough or guide, *m*, through which the strips of wood are fed. These are made like the ordinary pegs used in the shoe manufacture, but only split from the block into strips, so to represent a series of pegs joined together as seen at *n*, Fig. 8. The strip of peg-wood is fed forward at intervals the distance of a single peg at a time by a perpetual intermittent feed, or such a device as will feed an infinite series of pegs in succession. This may be effected by a variety of apparatus—such as feed-rollers, or a feed-roller and spring, or an endless screw working into the lower serrated edge of the peg-wood, or by the device shown in the drawings at Fig. 9, all of which are well-known endless feeds, and are but the equivalents of each other.

The device shown at Fig. 9 is a reciprocating feed, in which *m* is the trough of guide through which the pegs are fed. On this trough or beside it there is a slide, *t*, that is made to slide by a vibrating lever, *s*, to the lower end of which the slide is attached by a connecting-rod. The lever *s* is vibrated by the upward and downward motion of the pegging-stock, hereinafter described, so that when it rises a small projection, *r*, thereon strikes the lever *s*, by which the peg-wood is fed forward ready to be cut off preparatory to being driven as the driver descends. The slide *t* has fingers attached to it that seize the wood strip when forced forward and carry it with them, and causing it to enter the recess *o'* above named.

To cut off the peg properly a cutter should pass through it in a line perpendicular to the top and bottom line, and in a plane at right angles to the sides thereof, (although this direction may be somewhat varied,) the cut being made from side to side through the peg-strip without regard to the course of the grain of the wood. This cut may be made by forcing a knife having an inclined back downward, guided by the inclination of the back, so as to cut across the section of wood with a shaving-stroke and make straight parallel cuts, however crooked the grain of the wood may be. This is represented in Fig. 11, in which *n* is the cross-section of the peg-wood; *p*, the knife in position before the cut is made; *x*, dotted lines showing the cut made.

Fig. 12 shows a modification in which the edge of the knife *p* is inclined, and the course of the knife parallel to the side of the peg-wood, as indicated by the dotted line, and the modification of the lateral cut is to force the cutter straight across the strip of peg-wood, as seen at Fig. 10. The edge of this knife is parallel with the side of the strip, and its motion is straight across the strip in a plane of motion at right angles thereto, the dotted lines *x x* showing the range of motion.

The combined action of the feed and cutter is, first, to feed forward the peg-wood in infinite series as it is put into the machine; and, secondly, to cut it off by a knife which is actuated by a cam, crank-pin, or eccentric, by which it receives its motion from the driving-shaft. The cutter, however moved, may be made to pass over the recess *o'* and form an inclosure for the peg until the driver pushes it down to drive it into the sole. It is obvious that if the recess were made to move sidewise, as it is where the shoe is fed by the awl, the cutter may remain in a stationary position and the peg-wood be forced against it and produce the same effect simply by reversing the stationary and moving parts.

The peg-driver and awl for making the holes and inserting the pegs may be on separate stocks and driven alternately; but I prefer to put them both into one sliding stock, which is made to slide up and down in the frame or standard of the machine.

In Fig. 1, *a a* is the base of the frame, from which rises the standard *b*, that at its upper end projects over sufficiently to hold the slide that pegs the shoe, and above the slide is the driving-shaft *h*, from which all the parts are moved. On this shaft there is an eccentric or crank or cam *g*, (the latter is shown in the drawings,) of any style known that will give the desired motion, which may be regular like a simple crank, or eccentric, or irregular. This latter can be effected by the cam seen in Fig. 1, or by a grooved cam, and this irregular motion I prefer; but it is essential that the motions up and down should be positive and controlled in their range, forcing down the awl and peg to the precise point, and driving them back to a proper point at each action.

The awl and peg-driver stock is shown at Fig. 4 detached. At Fig. 5 a modification is seen. The peg-driver plays up and down in the recess *o*, Fig. 6, into which the peg-strip is fed, and as the peg-driver descends it forces the peg down through into the sole of the boot or shoe in the hole previously made for it by the awl.

To move the shoe or boot when the awl is driven into the sole, the stock is moved sidewise by a cam or other equivalent driver. The stock may either slide sidewise or turn on an arm of sufficient radius to change the angle of the awl a little. Fig. 11 shows the first, Fig. 12 the second, method. The side movement of the stock when the awl is in the shoe-sole carries the shoe along the same distance and brings the hole thus made in the sole into line with the peg when driven, the effect being the same whether the sole is carried along straight or is swiveled to peg around a curve, the motion of the shoe being entirely dependent on the awl as a center.

To hold the shoe and properly present the sole to be pegged, I employ what I denominate a "universal" movement-carriage or holder. This is designed to give the shoe all the necessary movements to bring each portion of the edge of the curved and undulating sole up to a stationary point to receive a line of pegs all around. To effect this, I employ a horizontal lever, *b'*, Fig. 2, on one end of which I support a standard, *a'*, on the top of which standard there is a horizontal plane, *a''*. This is counterbalanced by a weight at the opposite end of the lever, *b'*, the fulcrum being at $b^2$. On the top of this plane two slides, one above the other, have a motion at right angles to each other, as clearly seen at Fig. 1, and on the top of the upper one the shoe is affixed. Now, it will be seen that if the lower plane has a revolving motion a movement in any direction can be effected; and if there is a gage at $g^4$ on the standard for the shoe to rest against it will be kept in place while being moved by the awl guided by the operator in any direction.

It is obvious that if the plane had a motion up and down, and the plate on which the shoe was clamped could slide freely on it without guides, the same effect might be produced.

Having thus fully described my invention, for which I ask this reissue, what I claim therein as new, and for which I desire Letters Patent, is—

1. Cutting off shoe-pegs from a strip of peg-wood or other material by means of a lateral or side cut that will cut straight across, substantially as and for the purposes set forth, when combined with suitable ways in which the strip slides, and machinery for driving the pegs, as specified.

2. Inclosing the peg by the cutter until it is driven, as specified, by making the cutter, when in position, a part of the guiding-tube, substantially as set forth.

3. The combination of the endless feed with a cutter for severing the pegs in a shoe-pegging machine, as above specified.

Witnesses: J. J. GREENOUGH.
JAS. W. FRASER,
E. G. GUEST.